United States Patent

Go

[11] Patent Number: 5,936,786
[45] Date of Patent: Aug. 10, 1999

[54] METHOD AND APPARATUS FOR PREVENTING OVERWRITING OF DATA BY IDENTIFYING UNRECORDED PORTIONS OF A RECORDING MEDIUM AND RECORDING INFORMATION THEREON

[75] Inventor: Jin-gon Go, Suwon, Rep. of Korea

[73] Assignee: Samsung Electronics Co., Ltd., Kyungki-do, Rep. of Korea

[21] Appl. No.: 08/721,336

[22] Filed: Sep. 26, 1996

[30] Foreign Application Priority Data

Sep. 26, 1995 [KR] Rep. of Korea ..................... 95-31912

[51] Int. Cl.⁶ ............................ G11B 15/18; G11B 27/02
[52] U.S. Cl. .............................................. 360/72.2; 360/13
[58] Field of Search ............................... 360/13, 60, 72.2, 360/72.1, 74.4, 4, 6, 27, 31; 369/32, 47, 48, 54, 58

[56] References Cited

U.S. PATENT DOCUMENTS

| | | | |
|---|---|---|---|
| 4,404,604 | 9/1983 | Ueki et al. | 360/72.1 X |
| 4,553,180 | 11/1985 | Hasegawa | 360/72.1 X |
| 4,636,878 | 1/1987 | Murayama | 360/72.1 X |
| 4,689,699 | 8/1987 | Harigaya et al. | 360/74.4 |
| 4,691,251 | 9/1987 | Ookawa et al. | 360/72.1 X |
| 5,644,447 | 7/1997 | Takayama et al. | 360/72.2 |

FOREIGN PATENT DOCUMENTS 2227592   8/1990   United Kingdom .................... 360/60

Primary Examiner—Paul W. Huber
Attorney, Agent, or Firm—Sughrue, Mion, Zinn, Macpeak & Seas, PLLC

[57] ABSTRACT

The present invention relates to a method and apparatus for recording and protecting information recorded on a recording medium. The method includes the steps of setting up a mode in which recording is performed on portions of the medium on which information has not been recorded in the medium, detecting portions of the medium where information has not been recorded in the recording medium, selecting a portion on which new information may be recorded among the detected portions, and recording new information from a starting position of the portion selected in the selecting step. According to the present invention, it is possible to prevent the unintentional erasure of the information recorded on the recording medium by confirming that the portion on which the information is recorded is a blank portion and recording new information on the blank portion.

5 Claims, 2 Drawing Sheets

METHOD AND APPARATUS FOR PREVENTING OVERWRITING OF DATA BY IDENTIFYING UNRECORDED PORTIONS OF A RECORDING MEDIUM AND RECORDING INFORMATION THEREON

BACKGROUND OF THE INVENTION

The present invention relates to a method and apparatus for recording and protecting information recorded on a recording medium. More particularly, the invention relates to a method and apparatus for recording new information on a recording medium after selecting a position to be recorded and distinguishing recorded and blank positions to prevent previously recorded information from being recorded over by mistake.

Generally, when new information is recorded on a video cassette tape on which information has previously been recorded, the recorded information is erased when subsequent information is recorded thereon. Therefore, in a conventional recorder, a safety tab is included on a tape to protect the recorded information.

FIG. 1 illustrates a video cassette tape having a conventional safety tab 10 to control whether recording is permitted. If the safety tab 10 is removed, recording is prevented. However, it is difficult to protect the recorded information using only such a protective mechanism since recording is possible when the space that is exposed by removing the tab is filled up by another means. Also, in a conventional system, a user must rewind or fast-forward the tape to search for an appropriate position for recording.

SUMMARY OF THE INVENTION

It is an object of the present invention to provide a recording method for protecting information recorded on a recording medium by detecting a recorded position in a recording medium and recording new information on a blank portion.

To achieve the above object, there is provided a method for recording information on a recording medium according to one of several information recording modes in an information recording apparatus, said method comprising the steps of setting up a mode in which recording is performed on portions of the medium on which no information has been recorded, detecting one or more portions on which information has not been recorded in the recording medium, selecting a portion on which new information is to be recorded among the detected portions, and recording new information from a starting position of the portion selected in the selecting step.

It is another object of the present invention to provide an apparatus using the above method for protecting information recorded on a recording medium.

To achieve the above object, there is provided an information recording apparatus, comprising signal detecting means for detecting a control pulse from a signal recorded in a recording medium, servo means for positioning the recording medium forward and backward relative to the signal detecting means according to a servo control signal so that the signal detecting means can detect whether signals are recorded on the recording medium, controlling means for perceiving a recorded portion of the medium when the control pulse is detected by the signal detecting means and for generating the servo control signal to drive the servo means to search for a region on which the control pulse is not detected in the recording medium, and recording means for recording new information on the region in which the control pulse is not detected by the signal detecting means, according to the perception result of the controlling means.

BRIEF DESCRIPTION OF THE DRAWINGS

The above object and advantages of the present invention will become more apparent from detailed descriptions of preferred embodiments with reference to the attached drawings in which.

DETAILED DESCRIPTION OF THE INVENTION

Figure 1:
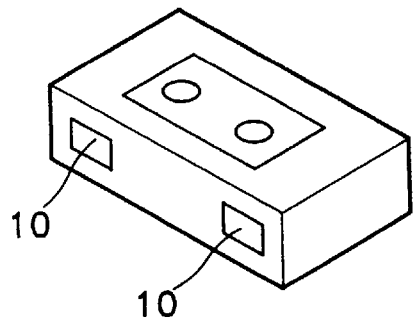
FIG. 1 shows a tape having a safety tab for preventing erasure.
Figure 2:
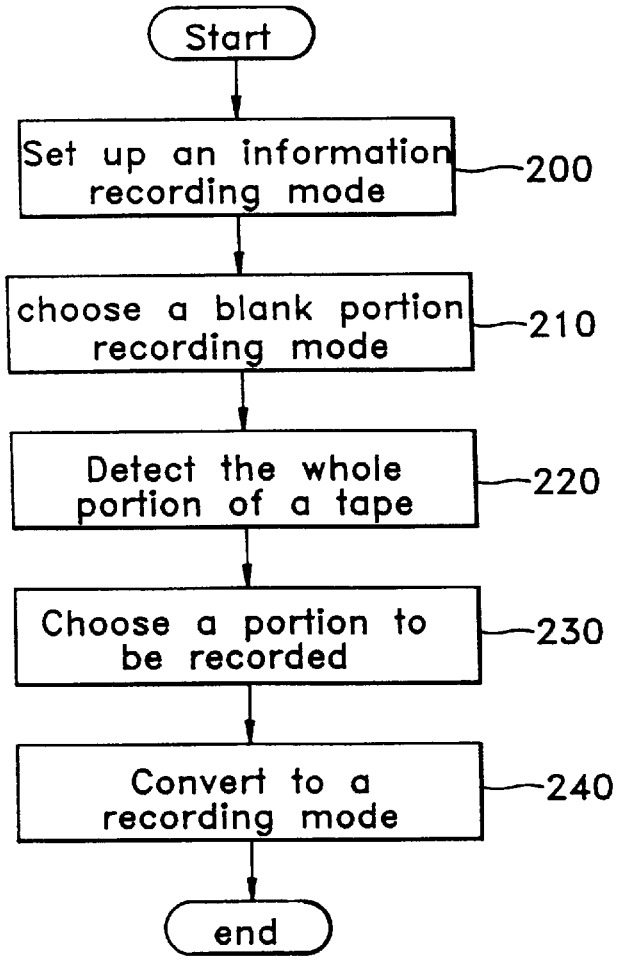
FIG. 2 describes an information recording method according to the present invention.

FIG. 2 describes an information recording method according to the present invention.

First, an information recording mode is set up (step 200). When the recording key is depressed to set up an information recording mode, a menu screen prompts a user to select whether recording is to be performed from the present position of a tape loaded in a deck, or whether the recording is to be performed on a selected blank position.

Step 210 corresponds to the situation where "blank position recording" is selected from the displayed menu screen. When the "blank position recording" is selected, the entire tape is scanned to determine whether the new information will be recorded or not (step 220). Scanning of the entire medium is performed by: (a) using an audio control head to read a first portion of the recording medium to determine whether a control pulse has been recorded on the first portion of the recording medium; (b) advancing the audio control head to a next portion of the recording medium; (c) using the audio controller to read the next portion of the recording medium to determine whether the control pulse has been recorded on this portion of the recording medium; and (d) repeating said steps (b) and (c) until the entire recording medium is scanned. Based on the scanning results, information concerning the portions of the tape which have been recorded on and the portions which have not is obtained. Namely, a portion in which a control pulse, extracted by an audio control head, is detected corresponds to a recorded portion of the medium, and a portion in which a control pulse is not detected corresponds to an unrecorded portion.

In step 230, a blank portion on which new information may be recorded is selected from among the detected portions when more than one blank portion is obtained in the previous detection step 220. Rewinding or fast-forwarding is performed to position a head on selected blank portion. As a result of the fast forwarding or rewinding, the head is positioned at the starting point of the selected blank region. More specifically, the starting point corresponds to a region where the control pulse has not been detected from the medium. When the starting position on which new information is recorded is determined in step 230, conversion to a recording mode is performed and the recording begins (step 240).

Figure 3:
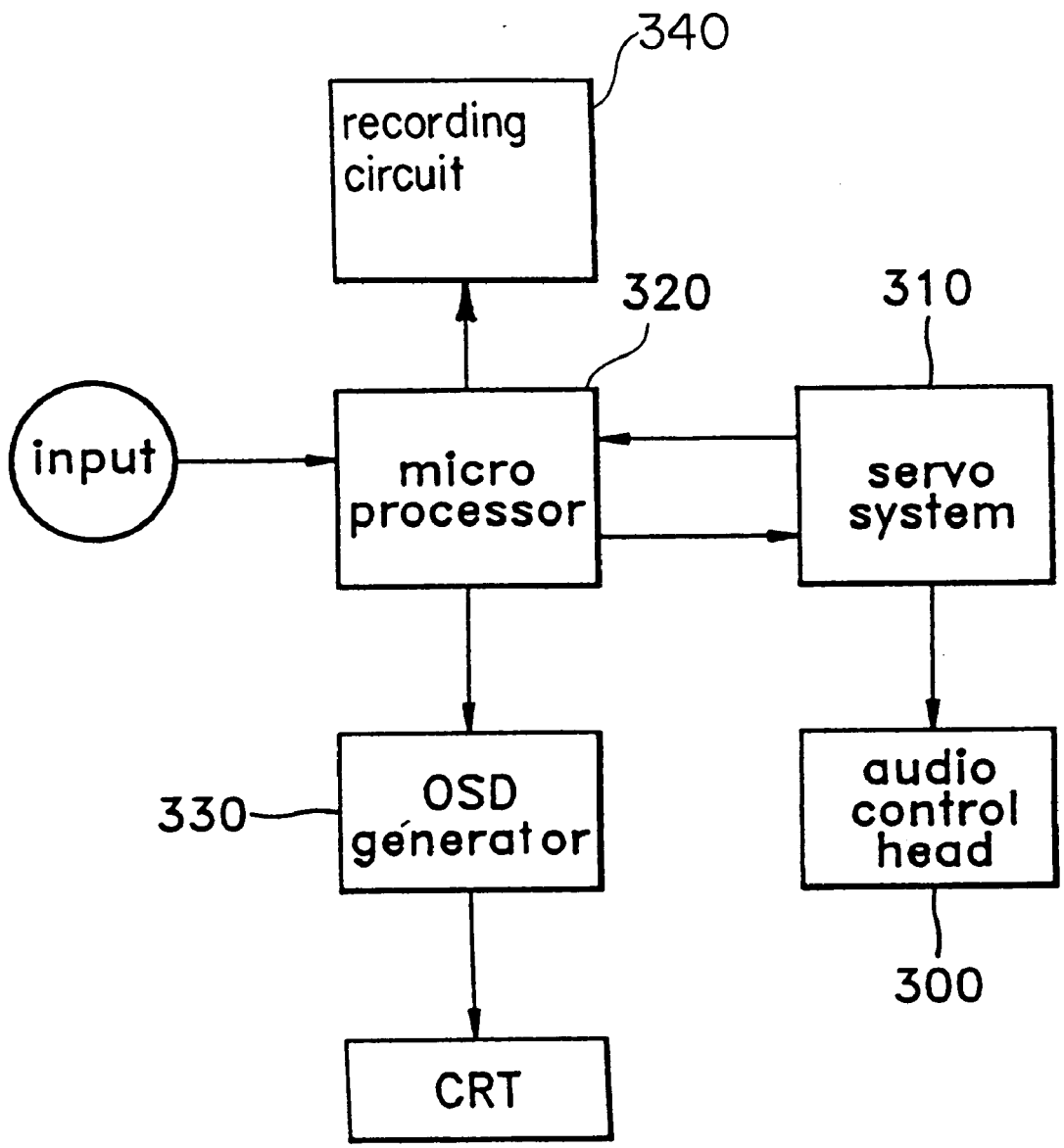
FIG. 3 describes an information recording apparatus according to the present invention.

FIG. 3 illustrates a recording apparatus for protecting the information recorded on a recording medium according to the present invention.

The audio control head 300 detects the presence or absence of a control pulse of an audio signal recorded on the magnetic tape or other medium (not shown). The servo system 310 amplifies a detected signal output from the audio control head 300 to a predetermined level so that the signal may be perceived by the microprocessor 320. The servo also performs rewinding or fast-forwarding of the tape according to a control signal from the microprocessor 320 to position the audio control head at different regions of the medium.

The microprocessor 320 perceives which portion of the magnetic tape is recorded and which portion of the magnetic tape is blank by using the detected output from the servo system 310. The microprocessor also provides the control signal for searching for the portion which has not been recorded to the servo system 310. The on screen display (OSD) generator 330 provides data for displaying a menu screen to a CRT according to a control signal from the microprocessor 320. The recording circuit 340 records information on designated portions of the recording medium.

The operation of the device shown in FIG. 3 is as follows.

When the recording key is selected as an input, the microprocessor 320 sends an instruction to the servo system 310 which in turn generates a servo signal for positioning the audio control head relative to the medium. Responding to the signal, the audio control head 300 scans the entire tape, detects whether the medium is recorded with an audio signal at a portion of the tape, and outputs a control signal to the servo system 310 based on whether a recorded signal is detected. Since a control pulse detected by the audio control head 300 is a minute signal, the servo system 310 amplifies the control signal to a predetermined level before outputting the amplified signal to the microprocessor 320. The microprocessor 320 perceives the input control signal and controls the servo system 310 to search for a blank portion according to the existence or non-existence of an audio signal on the medium as determined by the audio control head. At this time, the microprocessor instructs the OSD generator 330 to display the screen menu inquiring the user whether data should be recorded on the detected portion of the medium or not. The user input is used to control whether or not information is recorded to a particular blank portion of the tape.

According to the present invention, a method for protecting the information recorded on a recording medium and an apparatus therefor provides for prevention of an unintentional erasure of the information recorded on the recording medium by recording information on a blank portion after distinguishing recorded and blank portions of the medium.

Although specific embodiments of the present invention have been shown and described above, it will be obvious to those skilled in the art that various changes and modifications may be made without departing from the spirit and scope of the present invention.

What is claimed is:

1. An information recording apparatus, comprising:

signal detecting means for detecting the presence or absence of a control pulse from a signal received from a recording medium;

servo means for positioning the recording medium forward and backward relative to said detecting means according to a servo control signal so that said signal detecting means can read signals from different portions of the recording medium;

controlling means for perceiving as a recorded portion of the medium when the control pulse is detected by said signal detecting means and for generating said servo control signal to drive said servo means to search for a region of the medium where the control pulse is not recorded in the recording medium indicating a non-recorded portion; and recording means for recording new information on one or more portions of the medium where the control pulse is not detected by said signal detecting means, according to the perception of said controlling means.

2. An information recording apparatus for recording new information on a recording medium, comprising:

a key input means for selecting an information recording mode in response to a user input;

signal detecting means for detecting the presence or absence of a control pulse from a signal received from the recording medium;

servo means for positioning the recording medium forward and backward relative to said detecting means according to a servo control signal so that said signal detecting means can read signals from different portions of the recording medium;

controlling means for perceiving as a recorded portion of the medium when the control pulse is detected by said signal detecting means and for generating said servo control pulse to drive said servo means to search for a region of the medium where the control pulse is not recorded in the recording medium indicating a non-recorded portion; and recording means for recording new information on one or more portions of the medium where the control signal is not detected by said signal detecting means, according to the perception of said controlling means when said user input corresponds to a command to preserve previously recorded information on the recording medium.

3. A method for recording information on a recording medium according to an information recording mode in an information recording apparatus, comprising the steps of:

setting up a mode to prepare for recording on one or more portions of the medium where information has not been recorded in the recording medium;

detecting one or more portions where information has not been recorded in the recording medium;

selecting a portion where new information is to be recorded from among said detected portions; and recording new information on the medium from a starting position of the portion selected in said selecting step:

wherein said detecting step determines whether information has been recorded on the recording medium according to the existence or non-existence of a control pulse read from the recording medium.

4. A method for recording information on a recording medium according to an information recording mode in an information recording apparatus, comprising the steps of:

setting up a mode to prepare for recording on one or more portions of the medium where information has not been recorded in the recording medium;

detecting one or more portions where information has not been recorded in the recording medium;

selecting a portion where new information is to be recorded from among said detected portions; and recording new information on the medium from a starting position of the portion selected in said selecting step;

wherein said detecting step comprises scanning the entire medium by:

(a) reading a first portion of the recording medium to determine whether a control pulse is read from the first portion of the recording medium;

(b) advancing to a next portion of the recording medium;

(c) reading the next portion of the recording medium to determine whether the control pulse is read from said next portion of the recording medium;

(d) repeating said steps (b) and (c) until the entire recording medium is scanned, wherein the detection of recorded information on each said portion is determined by the presence or absence of the control pulse.

5. A method for recording information on a recording medium as claimed in claim 4 wherein the presence of the control pulse corresponds to a portion where information has been recorded on the medium and wherein the absence of the control pulse corresponds to a portion where information has not been recorded on the medium.

* * * * *